US00RE49613E

(19) United States
(12) Reissued Patent
Alkhimenko et al.

(10) Patent Number: US RE49,613 E
(45) Date of Reissued Patent: Aug. 15, 2023

(54) SCREEN FOR A FREE AND RESTRICTED OPERATING MODE

(71) Applicant: siOPTICA GmbH, Jena (DE)

(72) Inventors: Stepan Alkhimenko, Jena (DE); Markus Klippstein, Jena (DE); Ambrose Peter Nari, Jena (DE); Uwe Schroeter, Dornburg-Camburg (DE); Juergen Schwarz, Apolda (DE)

(73) Assignee: siOPTICA GmbH, Jena (DE)

(21) Appl. No.: 17/211,576

(22) Filed: Mar. 24, 2021

Related U.S. Patent Documents

Reissue of:
(64) Patent No.: 10,241,355
Issued: Mar. 26, 2019
Appl. No.: 15/778,105
PCT Filed: Nov. 24, 2016
PCT No.: PCT/EP2016/078711
§ 371 (c)(1),
(2) Date: May 22, 2018
PCT Pub. No.: WO2017/089482
PCT Pub. Date: Jun. 1, 2017

(30) Foreign Application Priority Data

Nov. 27, 2015 (DE) ..... 10 2015 015 516.4
Mar. 22, 2016 (DE) ..... 10 2016 003 627.3
(Continued)

(51) Int. Cl.
*G02F 1/13* (2006.01)
*F21V 8/00* (2006.01)
(Continued)

(52) U.S. Cl.
CPC ..... *G02F 1/1323* (2013.01); *G02B 6/0041* (2013.01); *G02B 6/0065* (2013.01);
(Continued)

(58) Field of Classification Search
CPC ... G02F 1/1323; G02B 6/0041; G02B 6/0065; G02B 6/0076; G02B 1/133502
See application file for complete search history.

(56) References Cited

U.S. PATENT DOCUMENTS 5,956,107 A 9/1999 Hashimoto et al.
5,993,940 A 11/1999 Ouderkirk et al.
(Continued)

FOREIGN PATENT DOCUMENTS

CN 105487292 A 4/2016
CN 206057756 U 3/2017
(Continued)

OTHER PUBLICATIONS

International Search Report for PCT/EP2016/078711, dated Mar. 3, 2017, 2 pages.

*Primary Examiner* — Deandra M Hughes
(74) *Attorney, Agent, or Firm* — Christensen, Fonder, Dardi & Herbert PLLC

(57) ABSTRACT

A screen having a free-viewing mode and a restricted-viewing mode, comprising a backlight emitting light into an unrestricted angular range in the free-viewing mode, and into a restricted angular range in the restricted-viewing mode. A transmissive imager is in front of the backlight. Light sources are outside the display area of the imager, and a transparent plate-shaped light guide scattering particles distributed therein is in front of the imager. In the free-viewing mode, the light sources are off, so that light from the backlight passing the imager passes the light guide unaffected. In the restricted-viewing mode, the lights are on, so that light radiating into a restricted angular range and passing the imager is superimposed by light that is scattered into the viewing space due to irradiation of light from the light guide. Thereby, the visibility of an image on the imager is reduced outside the restricted angular range.

26 Claims, 6 Drawing Sheets

(30) Foreign Application Priority Data

May 4, 2016 (DE) ..... 10 2016 005 626.6
Jun. 20, 2016 (DE) ..... 10 2016 007 814.6

(51) Int. Cl.
*G02F 1/1335* (2006.01)
*G02F 1/13357* (2006.01)

(52) U.S. Cl.
CPC ..... *G02B 6/0076* (2013.01); *G02F 1/1336* (2013.01); *G02F 1/133502* (2013.01); *G02F 1/133616* (2021.01); *G02F 1/133626* (2021.01)

(56) References Cited

U.S. PATENT DOCUMENTS

| | | | | |
|---|---|---|---|---|
| 6,765,550 | B2 | 7/2004 | Janick et al. | |
| 7,303,322 | B2 | 12/2007 | Lamb et al. | |
| 7,430,028 | B2 | 9/2008 | Tsai et al. | |
| 7,534,026 | B2 | 5/2009 | Uehara et al. | |
| 7,675,598 | B2 * | 3/2010 | Hong | G02F 1/1323 349/110 |
| 7,683,867 | B2 | 3/2010 | Inoue et al. | |
| 7,974,506 | B2 | 7/2011 | Wittenberg et al. | |
| 8,325,416 | B2 * | 12/2012 | Lesage | G02F 1/1335 359/462 |
| 8,928,555 | B2 | 1/2015 | Want et al. | |
| 9,121,999 | B2 * | 9/2015 | Yan | G02B 6/0053 |
| 9,244,329 | B2 * | 1/2016 | Shikii | H04N 13/32 |
| 9,448,341 | B2 * | 9/2016 | Tsuji | G02B 5/0236 |
| 9,881,531 | B2 * | 1/2018 | Klippstein | G09G 3/342 |
| 9,927,629 | B2 * | 3/2018 | Leng | G09F 9/35 |
| 10,036,846 | B2 | 7/2018 | Lee et al. | |
| 10,181,306 | B2 * | 1/2019 | Chang | G09G 3/3406 |
| 10,241,355 | B2 | 3/2019 | Alkhimenko et al. | |
| 10,712,488 | B2 * | 7/2020 | Heber | G02F 1/1323 |
| 10,838,133 | B2 * | 11/2020 | Heber | G02B 6/0036 |
| 11,131,876 | B2 * | 9/2021 | Takada | G02F 1/1333 |
| 11,355,074 | B2 * | 6/2022 | Heber | G09G 5/10 |
| 11,478,197 | B2 * | 10/2022 | Beck | A61B 5/702 |
| 2002/0063813 | A1 | 5/2002 | Dirscherl et al. | |
| 2002/0158967 | A1 * | 10/2002 | Janick | G02F 1/1323 361/679.22 |
| 2007/0008456 | A1 | 1/2007 | Lesage et al. | |
| 2007/0030240 | A1 | 2/2007 | Sumiyoshi et al. | |
| 2007/0285775 | A1 | 12/2007 | Lesage et al. | |
| 2008/0043490 | A1 | 2/2008 | Coleman et al. | |
| 2008/0079866 | A1 | 4/2008 | Mimura et al. | |
| 2008/0112187 | A1 | 5/2008 | Katsumata et al. | |
| 2008/0157009 | A1 | 7/2008 | Wittenberg et al. | |
| 2009/0067156 | A1 | 3/2009 | Bonnett et al. | |
| 2010/0177533 | A1 | 7/2010 | Griffiths et al. | |
| 2011/0128470 | A1 | 6/2011 | Yorita et al. | |
| 2011/0249939 | A1 | 10/2011 | Schmidt et al. | |
| 2011/0280044 | A1 * | 11/2011 | Niioka | F21V 13/02 362/326 |
| 2012/0051696 | A2 | 3/2012 | Schmidt et al. | |
| 2012/0235891 | A1 | 9/2012 | Nishitani et al. | |
| 2013/0162924 | A1 | 6/2013 | Sahouani et al. | |
| 2013/0308185 | A1 | 11/2013 | Robinson et al. | |
| 2014/0286044 | A1 | 9/2014 | Johnson et al. | |
| 2016/0170128 | A1 | 6/2016 | Groothues et al. | |
| 2016/0313494 | A1 | 10/2016 | Hamilton et al. | |
| 2017/0010407 | A1 | 1/2017 | Huang et al. | |
| 2017/0069236 | A1 | 3/2017 | Klippstein et al. | G09G 3/3406 |
| 2017/0176652 | A1 | 6/2017 | Wheatley et al. | |
| 2017/0261672 | A1 | 9/2017 | Liu et al. | |
| 2018/0003364 | A1 | 1/2018 | Wheatley et al. | |
| 2018/0059308 | A1 | 3/2018 | Li | |
| 2018/0267344 | A1 | 9/2018 | Wu | |
| 2018/0267362 | A1 * | 9/2018 | Gahagan | G02B 3/0068 |
| 2019/0004346 | A1 * | 1/2019 | Klippstein | G02F 1/1323 |
| 2022/0171249 | A1 * | 6/2022 | Bregulla | G02F 1/1323 |

FOREIGN PATENT DOCUMENTS

| | | | |
|---|---|---|---|
| CN | 206163104 | U | 5/2017 |
| CN | 107734118 | A | 2/2018 |
| DE | 100 45 407 | A1 | 3/2002 |
| DE | 10 2006 056 150 | A1 | 5/2008 |
| DE | 10 2014 003 298 | A1 | 9/2015 |
| DE | 10 2014 018 227 | A1 | 6/2016 |
| EP | 2 270 556 | A1 | 1/2011 |
| EP | 2 662 713 | A1 | 11/2013 |
| EP | 3 115 839 | B1 | 3/2019 |
| EP | 3 244 256 | B9 | 7/2019 |
| EP | 3 511 616 | A1 | 7/2019 |
| GB | 2 428 128 | A | 1/2007 |
| JP | 2007-155783 | A | 6/2007 |
| TW | 201643473 | A | 12/2016 |
| WO | WO 2005/071449 | A2 | 8/2005 |
| WO | WO 2007/100458 | A1 | 9/2007 |
| WO | WO 2007/140345 | A2 | 12/2007 |
| WO | WO 2011/124412 | A1 | 10/2011 |
| WO | WO 2012/033583 | A1 | 3/2012 |
| WO | WO 2013/173483 | A1 | 11/2013 |
| WO | WO 2015/010871 | A1 | 1/2015 |
| WO | WO 2015/121398 | A1 | 8/2015 |
| WO | WO 2016/160048 | A1 | 10/2016 |
| WO | WO 2017/027618 | A1 | 2/2017 |
| WO | WO 2017/065745 | A1 | 4/2017 |
| WO | WO 2017/089482 | A1 | 6/2017 |
| WO | WO 2018/141823 | A1 | 8/2018 |
| WO | WO 2018/182991 | A1 | 10/2018 |

* cited by examiner

SCREEN FOR A FREE AND RESTRICTED OPERATING MODE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

The present application is a National Phase entry of PCT Application No. PCT/EP2016/078711, filed Nov. 24, 2016, which claims the benefit of German Patent Application No. 10 2015 015 516.4, filed Nov. 27, 2015, German Patent Application No. 10 2016 003 627.3, filed Mar. 22, 2016, German Patent Application No. 10 2016 005 626.6, filed May 4, 2016, and German Patent Application No. 10 2016 007 814.6, filed Jun. 20, 2016, which are incorporated herein by reference in their entireties.

FIELD OF THE INVENTION

In recent years, great strides have been made in enlarging the visual angle of LCDs. Frequently, however, there are situations in which such a very large angular viewing range of a screen can be a disadvantage. Increasingly, information such as banking data or other private particulars and sensitive data becomes available on mobile devices such as notebooks and tablet PCs. Accordingly, users require some control of who is allowed to see such sensitive data; they must be able to choose between a wide viewing angle in order to share displayed information with others, e.g., when looking at vacation snaps or reading advertisements, and a narrow viewing angle in order to keep displayed information secret.

DESCRIPTION OF PRIOR ART

Accessory films on the basis of microlouvers have already been used for mobile display screens to achieve optical data protection in a so-called privacy mode. However, such films could not be switched between modes but had to be applied and removed manually. Also, they have to be carried separately from the display screen when not in use. Another substantial disadvantage is the light loss accompanying the use of such louver films.

U.S. Pat. No. 6,765,550 describes such privacy protection provided by a filter of microlouvers. Here, the biggest disadvantages are the need to mechanically attach or remove the filter, and the light loss suffered in the protected mode.

U.S. Pat. No. 5,993,940 describes the use of a film the surface of which is provided with small, regularly arranged prismatic strips to create a privacy mode. The development and fabrication of this film are quite complicated.

In WO 2012/033583, switching between free and restricted viewing is effected by the triggering of liquid crystals arranged between so-called "chromonic" layers. This involves a light loss, and implementation is rather complicated, too.

US 2009/0067156 discloses a great number of ideas to configure an illuminating system and a display device. In particular, the version illustrated there in FIGS. 3A and 3B uses two back-lights consisting of wedge-shaped light guides, and an LCD panel, where the posterior backlight 40 is intended to positively create a wide illuminating angle, and the anterior backlight 38 is intended to positively create a narrow illuminating angle. It remains unclear, however, in what manner the backlight 38 is meant to create a narrow illuminating angle without converting the light having a wide illuminating angle, which originates from backlight 40, essentially into light having a narrow illuminating angle when it passes backlight 38.

Regarding the embodiment shown in FIG. 5 of US 2009/0067156, it should be noted that the two light guides 46 and 48 each produce "narrow light", i.e. light with a narrow illuminating angle. Conversion of the light in light guide 48 into "wide light", i.e. light with a wide illuminating angle, is only achieved by means of a partial mirror 50, which has to be provided with prism structures in a complex process. This conversion extremely diminishes the light intensity, because the light at first exiting in a narrow illuminating angle (the only light available) is then spread out into a wide illuminating angle, as a rule into the semispace. As a result, the brightness (with reference to the luminance) will be reduced by a factor of 5 or higher, depending on the parameters. Thus, this embodiment is of little practical relevance.

In the embodiment according to FIG. 7 of US 2009/0067156, a phosphor sheet that converts UV light into visible light is an absolute must. This is rather laborious to do; and given the desire to get sufficient light from the backlight to illuminate an LCD so that it can be read, one needs very high UV intensities. Therefore, this embodiment is expensive and complicated; shielding off the UV radiation alone makes it impracticable.

US 2012/0235891 describes a highly complex backlight in a screen. According to FIGS. 1 and 15, this design employs not only several light guides but also other complex optical elements such as microlens elements 40 and prism structures, which convert the light coming from the posterior illumination on the way to the anterior illumination. This is expensive and complicated to implement, and it involves a light loss. According to the version shown in FIG. 17 in US 2012/0235891, both light sources 4R and 18 produce light having a narrow illuminating angle, with the light emitted by the posterior light source 18 first being laboriously converted into light with a large illuminating angle. This complex conversion greatly diminishes brightness, as noted already above.

According to JP 2007-155783, special optical surfaces 19 that are difficult to compute and to manufacture are used to deflect light into varied narrow or broad regions depending on the angle of light incidence. These structures are similar to Fresnel lenses. Furthermore, there exist inactive edges, which deflect light into unwanted directions. Thus, it remains uncertain whether really useful light distributions can be achieved.

For achieving restricted vision as taught by GB 2428128 A, additional light sources, which are arranged at a distinct distance from the screen, and illuminate a hologram attached to the screen, are used to overlay the lateral view with special wavelengths. The disadvantages here are the necessary spacing of the light sources from the screen, and the complexity of making suitable holograms.

US 2013/0308185 describes a special light guide provided with steps, which emits light at a large area into various directions, depending on the direction in which it is illuminated from an edge. In interaction with a transmissive imager, e.g., an LC display, a screen that is switchable between a free and a restricted viewing mode can be produced. Here, it is a disadvantage, among others, that the restricted view effect can be created either for the left/right or the top/bottom direction only, but not for left/right/top/bottom simultaneously as desirable for certain payment actions. In addition, some residual light is visible from blocked viewing angles even in the restricted viewing mode.

Finally, DE 10 2014 003 298 A1 describes a method and arrangement for the optional restriction of the recognizability of images. For this, a special optical element is needed, which is transparent to at last 70% of the light originating from the screen, and which deflects light incident from lateral light sources into a restricted angular range in such a way that, in directions extending in angles $\alpha$ greater than $\gamma$, with $\gamma>20°$, to the surface normal of the screen, the light emanating from the screen is superimposed with the light deflected by the optical element, whereby the image presented on the screen can, essentially, be seen without restrictions only from angles $\beta<\gamma$ to the surface normal of the screen.

The methods and arrangements mentioned above have, as a rule, the common disadvantages that they distinctly reduce the brightness of the basic screen, and/or require an active, but at least a special, optical element for switching between the modes, and/or are complicated and expensive to fabricate, and/or degrade resolution in the free viewing mode.

DESCRIPTION OF THE INVENTION

Therefore, a problem solved by the invention is to provide a screen on which secure presentation of information can be implemented by way of an optionally restricted viewing angle, with a second or further operating mode enabling free vision with a viewing angle that is as unrestricted as possible. The invention is meant to be implementable by simple means and as low-prized as possible. In both operating modes, the highest possible resolution, with particular preference the native resolution of the screen used, is to be evident. Further, the invented solution is intended to cause the least possible light loss.

According to the invention, this task is solved by means of a screen that can be operated in at least two operating modes, viz B1 for a free viewing mode and B2 for a restricted viewing mode. Such a screen primarily comprises:

- a backlight extended in a planar manner, which, in operating mode B1 for a free viewing mode, emits light in an unrestricted angular range, and which, in operating mode B2 for a restricted viewing mode, emits light in a restricted angular range, and
- a transmissive imager arranged in front of the backlight as seen in the viewing direction. This imager may be configured as an LCD panel or another transmissive light modulator. Being designed for the display of images, the imager may also be called an image display device.

In a first embodiment, the screen comprises light sources arranged outside the active image display area of the imager as seen in the viewing direction, and simultaneously at a distance of at least one millimeter above the imager. The light sources may also be arranged at a distance of two, three, four, five or six millimeters or yet higher above the imager.

In a second embodiment alternative or supplementary to the one just described, the screen comprises a plate-shaped light guide situated in front of the imager as seen in the viewing direction,—i.e., in contact with or at a distance from the transmissive imager, the distance being, e.g., 0 mm, 1 mm, 2 mm, 5 mm, 8mm or 10 mm A—, the said light guide consisting of a transparent thermoplastic or thermoelastic material and scattering particles distributed therein, in which case light sources are arranged laterally at the edges of the light guide. Supplementarily or alternatively to the scattering particles, the plate-shaped light guide may be provided with outcoupling elements on at least one of the two faces. These elements can be formed on the plate-shaped light guide during its fabrication or attached to it subsequently. The outcoupling elements may be holographic or etched structures, for example.

If the plate-shaped light guide is used supplementing the first embodiment, in which the light sources are arranged at least one millimeter above the imager, the light guide is also arranged at a distance of at least one millimeter above the imager. The light guide may also be arranged at a distance greater than 1 mm above the imager, e.g., at a distance of 2, 3, 4, 5 or 6 mm.

In operating mode B1, the light sources are switched off, so that the light emanating from the backlight and subsequently passing the transmissive imager remains essentially uninfluenced by the light sources or—where a light guide is provided—passes the light guide essentially unaffected by it.

In operating mode B2, the light sources are on, so that the light radiated by the backlight into a restricted angular range and then passed by the transmissive imager is superimposed on light that—without the use of a light guide—the imager, due to being irradiated with light from the light sources, scatters or reflects back into the viewing space, or that—with a light guide being provided—the imager, due to being irradiated with light from the light guide (3), scatters or reflects back into the viewing space and/or radiates into the viewing space in a planar manner over a wide angular range. Here, "wide" means an angular range of at least 120° or more, almost up to the semispace in front of the light guide.

In all, this markedly reduces or even completely eliminates the residual visibility of an image presented on the transmissive imager outside the said restricted angular range.

In operating mode B2, the image perceived from oblique viewing directions that are blocked by the angular restriction is a grey or white surface (depending on the configuration of the light sources), but not a black surface, as a rule, because the light radiated by the light guide visibly outglares even a black image content.

The backlight extended in a planar manner may, for example, be configured as proposed in WO 2015/121398 or in US 2013/0308185. Other configurations are possible, of course. Although in most embodiments known in prior art, such a backlight extended in a planar manner emits, in operating mode B2 for a restricted viewing mode, light into a restricted angular range, this directional selection is not perfect by far, with the result that on a transmissive imager in front of such a backlight one can, even from an oblique direction, discern the complete image content or a large portion of it, even though with low brightness and/or with faint contrast in bright-to-dark transitions. The present invention eliminates this still possible oblique viewing completely or almost completely: The fact that the light radiated by the backlight into a restricted angular range and then passing the transmissive imager is superimposed on light radiated by the light guide in a planar manner over a wide angular range substantially reduces or often completely eliminates the residual visibility of an image presented on the transmissive imager outside the restricted angular range. The said residual visibility is due, among other things, to the fact that many LCD panels exhibit a volume scattering and/or have a scattering antiglare surface, which partially scatter the light incident from behind and directed into restricted spatial angles, which provide residual visibility even at oblique angles.

As a rule, the plate-shaped light guide has a haze value of less than 10%, or preferably less than 4%, as measured according to ASTM D1003. Furthermore, scattering particles eligible in particular are particles of titanium dioxide. Other embodiments are possible, such as light guides with particles of barium sulfate, silsesquioxane particles, cross-linked polystyrene particles or yet other kinds of particles. As a rule, the scattering particles are homogeneously distributed, so that the light guide does not have any inhomogeneous optical structure. Moreover, the plate-shaped light guide has at least two faces facing each other, which are arranged in parallel with, or tilted relative to each other. A wedge-shaped structure is possible as well, although it is of advantage if the faces are parallel to each other. Useful thicknesses of the light guide typically are between including 0.5 mm and including 4 mm. Other thicknesses may be useful in particular cases.

In a favorable embodiment, the backlight consists of a surface emitter that is preferably configured as a light guide with laterally disposed light sources, at least one light collimator integrated into the surface emitter and/or arranged in front of it—for example, two crossed BEF films, two crossed "Optical Lighting Films" (OLF) Type 2301 made by 3M™, and/or one or several privacy filters, e.g., Vikuiti made by 3M™—, a plate-shaped, transparent anterior light guide that is arranged in front of the light collimator as seen in the viewing direction and that is made of a transparent thermoplastic or thermoelastic material with scattering particles distributed therein and/or is provided with outcoupling elements on at least one of the faces, and anterior light sources arranged laterally at the edges of the anterior light guide. Here, in operating mode B1 for a free visual range, at least the anterior light sources and, optionally, the surface emitter is switched on; i.e., if the surface emitter is configured as a light guide, the light sources of the surface emitter will be switched on, of course. In operating mode B2 for a restricted visual range, the anterior light sources are switched off and the surface emitter is switched on; i.e., if the surface emitter is configured as a light guide, the light sources assigned to it will also be switched on.

The surface emitter may be configured, e.g., as a sidelight, edgelight, direct LED backlight, edge LED backlight, dark-field illuminator, OLED or other surface emitter.

For the anterior light guide and, where provided, the light guide of the surface emitter, the various above-mentioned configurations of the light guide above the imager apply analogously.

Advantageously, the scattering particles in the transparent light guides are titanium dioxide particles of a mean particle size of 150 to 500 nm in a concentration of 0.01 to 300 wt.-ppm related to the weight of the respective light guide.

The transparent light guides may each consist of a matrix plastic A and, distributed therein, scattering particles of a polymerizate B, with the said scattering particles making up 0.01 to 3 wt.-% related to the matrix plastic A, and with the polymerizate B having a refractive index nD(B) that is higher than the refractive index nD(A) of the matrix plastic A by at least 0.002 units, preferably by at least 0.01 units.

Further, the light guides may contain at least 40 wt.-%, or preferably at least 60 wt.-%, of polymethyl methacrylate related to their weight.

Moreover, it may be of advantage if means for reflection diminishing, e.g., an antiglare and/or antireflection coating, are applied to the top surface of the imager and/or to at least one of the faces of the light guide in front of the imager. In connection with the invention, especially an antiglare coating will not only reduce direct reflections of external light spots, but also permit the light radiated by the light guide 3 towards the imager 5 to be diffusely reflected back.

Furthermore, it is possible to configure the backlight to be non-switchable, i.e., to permanently emit light approximately into the semispace.

In all configurations mentioned above, the said light sources may be LEDs, LED rows or laser diodes. Other versions are feasible as well and are within the scope of the invention.

In another preferred embodiment, the light sources are adapted to emit colored light. Colored light is understood to mean especially visible light that is not white, i.e., light in the colors of, e.g., red, green, blue, turquoise, yellow, cyan or magenta. Further, this light can optionally be emitted at varied levels of brightness.

Moreover, it is possible for the color and/or brightness of the light emitted by the light sources, to be modulated with time. In addition, the light sources can be implemented by different individual light sources or luminous elements, say RGB-LEDs in LED rows emitting light of different colors and/or different brightness either simultaneously or at a temporal and/or spatial offset.

In operating mode B2, then, the image perceived from oblique viewing directions blocked by the angular restriction is an area of the respective color depending on the configuration of the light sources, but, as a rule, it will not be a black or white area, because the colored light radiated by the light guide will, from an oblique viewing direction, visibly outglare even a bright image content.

The light sources may emit light of a color that is not present in the image presented by the transmissive imager. Alternatively, the light sources may emit light of a color that is present in the image presented by the transmissive imager or is close to such a color in the color spectrum. Also, the light sources may emit light of a color approximately corresponding to the color complementary to that present in the image presented by the transmissive imager.

Further rules may be laid down, for example that the color selected in the image that indicates the selection of the color of the light of the light sources, can be the color most frequently present in the image in terms of area. The wavelength ranges of the light emitted by the light sources may spectrally be completely or partially or not at all identical with the wavelength ranges of the light originating from the imager.

Using the invented screen is of particular advantage in connection with the entry or display of confidential data, e.g., PIN numbers, E-mails, SMS texts or passwords at ATMs, payment terminals or mobile devices.

In all embodiments, each light guide provided has at least one light entry surface and at least one light exit surface, with the ratio between light exit surface and light entry surface being at least 4.

The light guide or the light guides have a concentration of scattering particles of titanium dioxide of preferably 0.1 to 50 wt.-ppm or, with particular preference, 0.1 to 10 wt.-ppm. The titanium dioxide particles have a mean particle size of 160 to 450 nm or, with particular preference, 170 to 400 nm. The haze value of the light guides, measured in accordance with ASTM D1003, is preferably in a range of 0.2 to 2%. Behind the hindmost light guide of the backlight, if a light guide is present there, there may be arranged a white and/or reflecting surface, for example.

Furthermore, in the invented screen there may be arranged an electronic control system, which gradually controls the transition between the operating modes B1 and B2 or vice versa, by appropriately triggering the backlight, the light sources and, where present, further components. Herewith, it may be provided that, over a course of time, the brightness of one or several components (as a rule, light sources) is controlled down to zero, whereas at the same time the brightness of other components (as a rule, other light sources) is controlled up to a maximum or a specified level, and vice versa.

Further, in certain embodiment versions it may be provided that the light guide in front of the imager is partially mirror-coated on its side facing the imager. The degree of mirroring may vary across the area of the light coupled out of the light guide, to compensate brightness differences in operating mode B1, or the partial mirror coating may cover only such areas in which, without mirroring, brightness has dropped below a specified limit.

As a matter of principle, variation of the above-described parameters within certain limits does not affect the ingenuity of the invention.

Furthermore, the desired restricted angular ranges for mode B2 can be defined and implemented separately for viewing restriction in the horizontal and the vertical direction. For example, it might be useful to have a larger angle (or possibly no restriction at all) in the vertical direction than in the horizontal one, for example if, at an ATM, persons of different body height are intended to see something, whereas viewing from the side is meant to be greatly restricted. For POS payment terminals, on the other hand, safety regulations often make it necessary in mode B2 to restrict vision in both the horizontal and vertical directions.

The problem of the invention is also solved by means of a screen that can be operated in at least two operating modes, viz B1 for a free viewing mode and B2 for a restricted viewing mode, with the screen primarily comprising a backlight extended in a planar manner, which, in operating mode B1 for a free viewing mode, emits light in an unrestricted angular range, and which, in operating mode B2 for a restricted viewing mode, emits light in a restricted angular range, wherein the light originating from the backlight is radiated at no more than 6% of the maximum luminous intensity in at least one direction situated in an angle greater than 45 degrees relative to the surface normal of the backlight. The screen further comprises a transmissive imager arranged in front of the backlight as seen in the viewing direction, light sources arranged laterally at the edges of the light guide, and at least one plate-shaped light guide that is arranged in front of the backlight as seen in the viewing direction, and that either consists of a thermoplastic or thermoelastic material with scattering particles homogeneously distributed therein, or is provided with outcoupling elements on at least one of its faces.

In case of the presence of scattering particles in the light guide, these consist of titanium dioxide, barium sulfate, silsesquioxane particles and/or cross-linked polystyrene particles with a mean particle size of 150 to 500 nm, which are employed in a concentration of 0.01 to 300 wt.-ppm related to the weight of the light guide. In this case, the light guide has neither anything printed on it, nor any light-scattering imperfections. Both in case of scattering particles being present and in case the light guide has outcoupling elements on at least one of the faces—with those elements being separately applied there or produced there, e.g., by etching—, the light guide is transparent to at least 85% of the light originating from the backlight.

In this way, on the one hand, the light from the light sources that, for a free viewing range in operating mode B1, is laterally incident into the light guide in directions at angles between 45 degrees and 75 degrees relative to the surface normal of the backlight, is radiated with at least 12% of the maximum light intensity of the light exiting the light guide normal to the surface, and, on the other hand, the light originating from the light sources (if they are switched on) and exiting the light guide from at least one point of its surface, in at least one angle $\alpha$ relative to the said surface, with $\alpha<80$ degrees, has a higher light intensity than the light exiting at the said point of the surface of the light guide normal to that surface.

In this connection, in operating mode B2 the backlight is on and the light sources are off, whereas in operating mode B1, at least the light sources are on.

For operating mode B1 it is imperative that the light sources are switched on, whereas the backlight may be switched on or off. If the backlight is switched off, only the light originating from the light sources provides the illumination without angular restriction. If, however, in operating mode B1, both the light sources and the backlight are on, higher brightness can be achieved. In this case it is particularly advantageous that the light emitted by the light sources (if they are on) and exiting from the light guide from at least one point of its surface, has, in at least one angle $\alpha$ relative to the surface of the light guide, with $\alpha<80$ degrees, a higher light intensity than the light exiting normal to the surface of the light guide at the said point of that surface. This technical implementation, namely, means that the light that originates from the light sources and does not have its highest brightness(es) approximately along the vertical bisector of the screen, on the one hand, and the light that originates from the backlight and has its highest brightness approximately along the vertical bisector of the screen on the other hand, excellently complement each other in order to achieve, at least across a half angle (e.g., the angle spectrum of the horizontal in front of the illuminating system), a brighter and more homogeneous illumination than that achievable if only the said light sources were switched on for operating mode B1.

In a further development of this embodiment, the angle of the direction in which the light originating from the backlight is radiated is greater than $45+\gamma$ degrees relative to the surface normal of the backlight, with the backlight featuring at least one layer intended to collimate the light emitted by the backlight, this layer having the highest transparency at an angle of $\gamma$, with $0<\gamma<45$ degrees relative to the surface normal of the backlight. The lateral tilt about the angle $\gamma$ is advantageous for various applications. In the cockpit of an airplane, for example, information may be visible only optionally, say, if the screen including the imager is arranged at the center of the control console. In operating mode B2, then, the tilt angle $\gamma$ restricts visibility to an oblique view of the system, i.e. by one pilot only.

The preferred scattering particles for the light guide are titanium dioxide particles in a concentration of 0.1 to 50 wt.-ppm, or better 0.1 to 10 wt.-ppm, related to the weight of the light guide. In addition or as an alternative, the titanium dioxide particles preferably have a mean particle size of 160 to 450 nm or, with particular preference, of 170 to 400 nm.

Furthermore, the light guide has a haze value of less than 7% or, preferably, less than 2%, in either case measured in accordance with ASTM D1003.

It is also of advantage if the light guide contains at least 40 wt.-% polymethyl methacrylate, or preferably at least 60 wt.-% polymethyl methacrylate, related to its weight.

A further embodiment of the screen provides that, for the operating mode B2, the light originating from the backlight and exiting in the viewing direction from the light guide at each point of its surface at angles β>30 (measured normal to the surface of the light guide and in horizontal orientation relative to that surface) has maximally 5% of the light intensity of the light exiting from such a point of the surface of the light guide normal to the said surface.

With particular preference, the backlight is additionally provided with at least one optical light-collimating layer in order to achieve an angularly restricted radiation characteristic of the light emitted by the backlight. The backlight is preferably a sidelight, edgelight, direct LED backlight, edge LED backlight, OLED or other surface emitter, on which a permanent privacy filter (e.g., Vikuiti™ made by 3M™ or LCF made by Shin Etsu™) is applied, which acts as a light collimator or spatial light filter, which causes the light that has passed it to be radiated by the backlight essentially in a restricted angular range only.

In addition to the collimation layer(s), components of the type of "Optical Lighting Film" (OLF) model 2301 made by 3M™, crossed at an angle of 90 degrees, may be provided to achieve pre-collimation and to bundle the light.

Further, the nearest optical component below the light guide may have a surface that at least partially reflects the light exiting downward from the light guide in operating mode B1. In this way, light radiated downward as described is at least partially reflected back into the light guide and at least partially passed by it. As the light guide radiates light from both its faces, i.e., upwards and downwards—the downward direction being that facing the backlight—, this provides a kind of light recycling. Here, it may suffice that the said nearest optical component, i.e., frequently the optical collimation layer (e.g., the privacy filter), is not antiglared or is provided with a partial mirroring layer that is as transparent as possible to light coming from below, i.e., from the backlight.

As a matter of principle, variation of the above-described parameters within certain limits does not affect the ingenuity of the invention. For example, the backlight may emit light having a radiation characteristic that causes the radiation of at most 0 to 20% of the maximum light intensity in directions situated within angles greater than 10 to 45 degrees relative to the surface normal of the backlight.

Regardless of this, furthermore, the light guide that is situated in front of the backlight, as seen in the viewing direction, and that is transparent to at least 85%—or even less than 85%, say, 70%, or even 50% only—of the light originating from the backlight, may deflect the light laterally incident from light sources into an angular range that is as wide as possible, so that, in directions situated within angles greater than 10° to 100° relative to the surface normal of the backlight, at least 10% to 70% of the maximum light intensity are radiated.

The light sources may be, e.g., LEDs or laser diodes. In addition, it is sensible to provide for light coupling from the laterally arranged light sources into the light guide to be effected from at least two, preferably opposite sides.

A very specially preferred feature is a transmissive imager—also called imager for short arranged in front of the screen, e.g., an LCD panel. This permits the two operating modes B1 and B2 to be analogously implemented for the screen.

Alternatively, it is possible for the light guide to be partially mirror-coated on its surface facing the backlight, with the degree of mirroring being varied across the area of the light coupled out of the light guide in order to compensate for brightness differences in operating mode B1, or with only such areas being partially mirror-coated in which, without mirroring, brightness has dropped below a specified limit.

Further, the screen may comprise a control system, which, in operating mode B1, compensates brightness differences across the area of the light coupled out of the light guide by means of a control, complementary to those brightness differences, of the image contents displayed on the transmissive imager, so that the image perceived on the transmissive imager is essentially homogeneous with regard to brightness.

The invented screen can be used to advantage for the entry or display of confidential data, e.g., of PIN numbers, E-mails, SMS texts or passwords, on ATMs, payment terminals or mobile devices.

Moreover, a partial mirror coating on the rear surface of the transmissive imager is of advantage for the further homogenization of the light yield from the light guide. This partial mirror coating, analogously to the partial mirror coating on the light guide, can also be provided with a variation or applied in certain areas only, to compensate for brightness differences.

It is also of advantage if the backlight is one that is collimating by its very design, i.e., if the light source is conceived to emit its light in a restricted angular range only, as described before. Furthermore, it may be favorable to always use the same light sources, e.g., the said laterally arranged light sources, for both operating modes. For switching between the two operating modes B1 and B2, the light will then, for example, be coupled once into the light guide and/or once into the backlight, e.g., by means of an optoelectronic and/or optomechanical switch. The switch may, e.g., be a shutter or some mechanical switch such as a tilting mirror. Also, the light sources may be configured to form two rows, with only the row being switched on that is desired or appropriate.

Further, the radiation directions desired or allowed for mode B2 (for restricted viewing) may be defined and implemented separately for the horizontal and the vertical direction. For example, it may be useful if the angle in the vertical direction is greater than that in the horizontal direction, e.g., if persons of differing body heights are intended to see information on an ATM, whereas the view sideways has to be greatly restricted. This is achieved especially by selection of the light-collimating layers, e.g., privacy filters.

It is understood that the features mentioned before and those to be explained below are applicable not only in the combinations stated but also in other combinations or as stand-alone features without leaving the scope of the present invention.

BRIEF DESCRIPTION OF THE DRAWINGS

Below, the invention will be explained in more detail with reference to the accompanying exemplary drawings, which also show features essential to the invention, among others, and in which.

The drawings are not to scale. They only illustrate principles, most of them as sectional views.

DETAILED DESCRIPTION OF THE DRAWINGS

Figure 1:
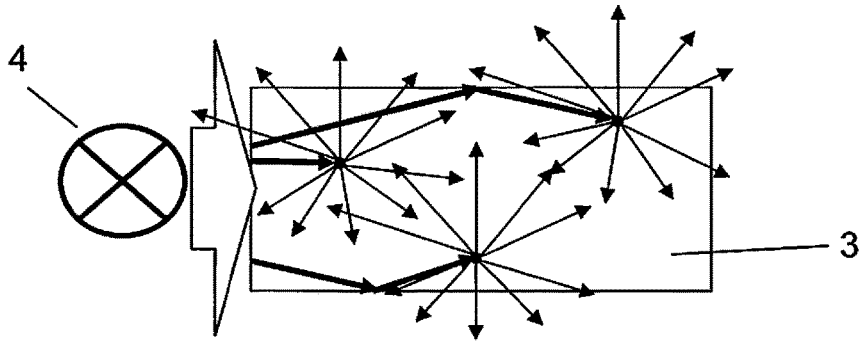
FIG. 1 is a sketch illustrating the principle of light laterally coupled into a light guide being coupled out into a great spatial angle.

FIG. 1 is a sketch illustrating the principle of light laterally coupled from light sources 4 into a light guide 3—shown here as a small segment in a sectional view—being coupled out into a great spatial angle. The light may be colored. The small dots represent scattering particles as centers of scattering the light coupled in laterally from the light sources 4. Due to total reflection, rays of the coupled-in light (represented by bold arrows) are reflected by the outer wall and thrown back into the light guide 3 until they finally hit a scattering particle to undergo the desired outcoupling. This outcoupling is represented by the lot of thin arrows. For better understanding, the representation in FIG. 1 is highly schematic; in reality, the light guide 3 guides a vast number of ray paths.

Figure 2:
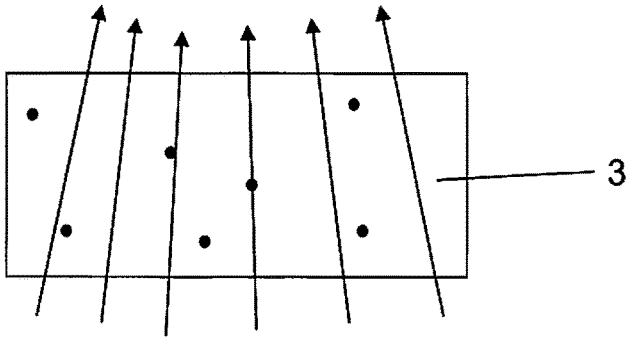
FIG. 2 is a sketch illustrating the principle of light originating from a backlight being passed through a light guide.

FIG. 2 is a sketch illustrating the principle of light originating from a backlight 2 (not shown in the drawing) being passed through a light guide 3. Here, the scattering particles play a part that is essentially negligible, because the light originates from the backlight 2, i.e., the light is not coupled in laterally through an edge from light sources 4, and therefore it is not, or scarcely, deflected back and forth by total reflection in the light guide 3.

Figure 3:
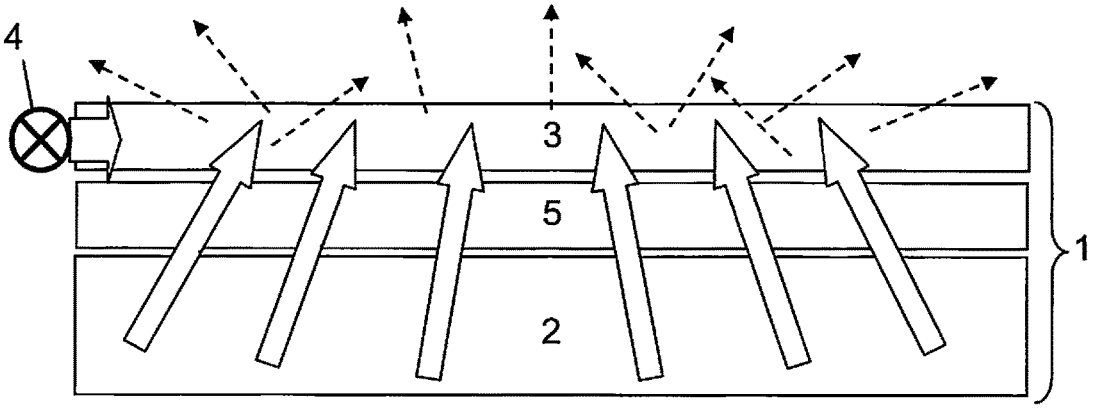
FIG. 3 is a sketch illustrating the principle of a first embodiment of a screen in an operating mode for a restricted viewing mode.

FIG. 3 is a sketch illustrating the principle of a screen 1 in an operating mode B2 for a restricted viewing mode, wherein a transmissive imager 5 is illuminated by light with a restricted spatial angle, and wherein light from a light guide 3 (represented by dashed arrows) is superimposed on the light modulated by the imager 5 to enhance the privacy protection effect. The imager 5 is arranged in front of the backlight 2 as seen in the viewing direction; it may, for example, be an LCD panel or some other transmissive light modulator. Arranged in front of the imager 5 as seen in the viewing direction, and in contact with or at a distance from it, is a plate-shaped light guide 3, which here consists of a transparent thermoplastic or thermoelastic material and scattering particles distributed therein but, as an alternative or a supplement, may also be provided with outcoupling elements on at least one of its faces. Arranged laterally on edges of the light guide 3 are light sources 4. In FIG. 3, the light sources 4 are shown on one edge only, but they may also be arranged on the opposite edge of the light guide 3, or on three or even all four edges.

In operating mode B2, for a restricted viewing mode, the backlight emits light in a restricted angular range. The light sources 4 are switched on, so that the light that is radiated by the backlight 2 into a restricted angular range and then passing the transmissive imager 5 (represented in FIG. 3 by the bold arrows) is superimposed upon by light (represented by dashed lines) that the light guide 3 now radiates in a planar manner into a large angular range, (i.e., in this case covering an angle of at least 120 degrees or extending nearly up to the semispace in front of the light guide 3), whereby the residual visibility of an image displayed on the transmissive imager 5 outside the said restricted angular range is (markedly) reduced or even completely eliminated.

The light modulated by the imager 5 with image information of an image (not shown here) may also be superimposed upon by colored light from the light guide in order to enhance the privacy protection effect. "Colored light" especially refers to visible light that is not white, as e.g., light of the colors red, green, blue, turquoise, yellow, cyan or magenta. Further, this light may be optionally radiated at varied brightness levels.

In addition, it is possible for the color and/or brightness of the light originating from the light sources 4 to be modulated with time. Moreover, the light sources 4 may also be implemented with various individual light sources such as RGB LEDs in LED rows that emit light of different colors either simultaneously or with a temporal and/or spatial offset.

Figure 4:
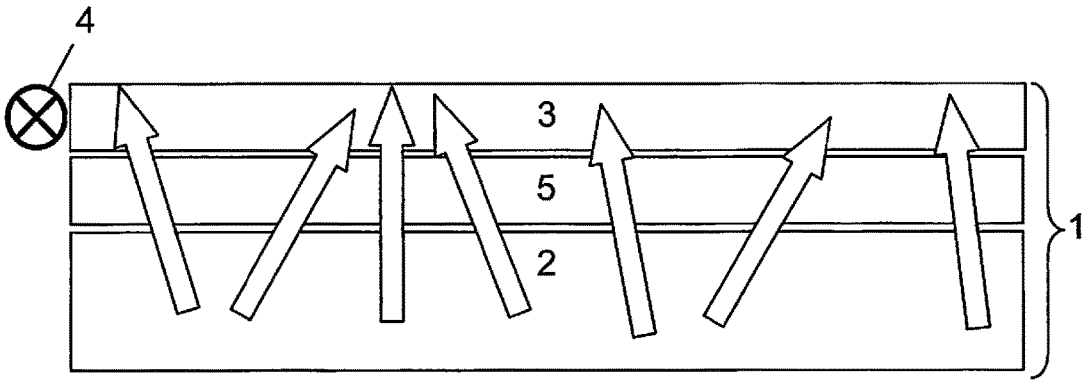
FIG. 4 is a sketch illustrating the principle of the first embodiment of the screen in an operating mode for a free viewing mode.

Compared with this, FIG. 4 is a sketch illustrating the principle of the screen 1 in operating mode B1 for a free viewing mode, wherein the imager 5 is illuminated with light in a spatial angle that is not restricted, and wherein the light modulated by the imager 5 is not superimposed upon by light originating from a light guide 3.

In operating mode B1 for a free viewing mode, the backlight 2 emits light in an unrestricted angular range. Unlike in operating mode B1, the light sources 4 are switched off, so that the light originating from the backlight 2 and then passing the transmissive imager 5 passes the light guide 3 essentially unaffected.

Figure 5:
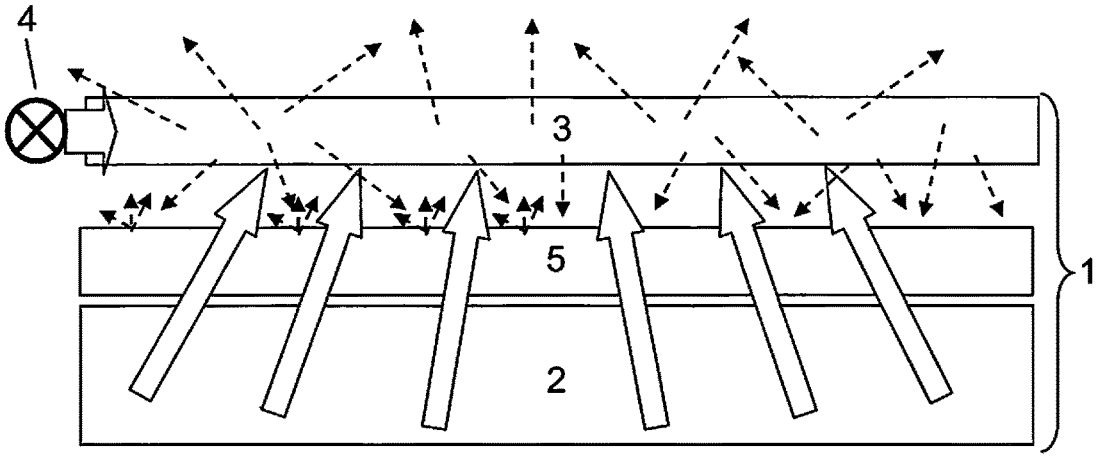
FIG. 5 is a sketch illustrating the principle of a second embodiment of a screen in the operating mode for a restricted viewing mode.

FIG. 5 is a sketch illustrating the principle of a second embodiment of a screen 1 in operating mode B2 for a restricted viewing mode. Here, unlike the embodiment shown in FIG. 3, the light guide 3 is arranged above the imager 5 at a distance of at least 1 mm, or nearer to the viewer. The light sources 4, too, are arranged outside the active image display area of the imager 5 as seen in the viewing direction, and, at the same time, at a distance of at least 1 millimeter above the imager 5, at the same height as the light guide 3. In operating mode B2, the light sources 4 are switched on, and light radiated by the backlight 2 into a restricted angular range and then passing the transmissive imager 5 (represented in FIG. 5 by the hollow arrows) is superimposed upon by light that the imager 5, due to the radiation of light from the light guide 3, diffusely and/or directly scatters and/or reflects back into the viewing space (here represented by short dashed arrows), and/or that is radiated by the light guide 3 into the viewing space (here represented by longer dashed arrows), so that the residual visibility of an image displayed by the transmissive imager 5 outside the said restricted angular range is decreased.

Figure 6:
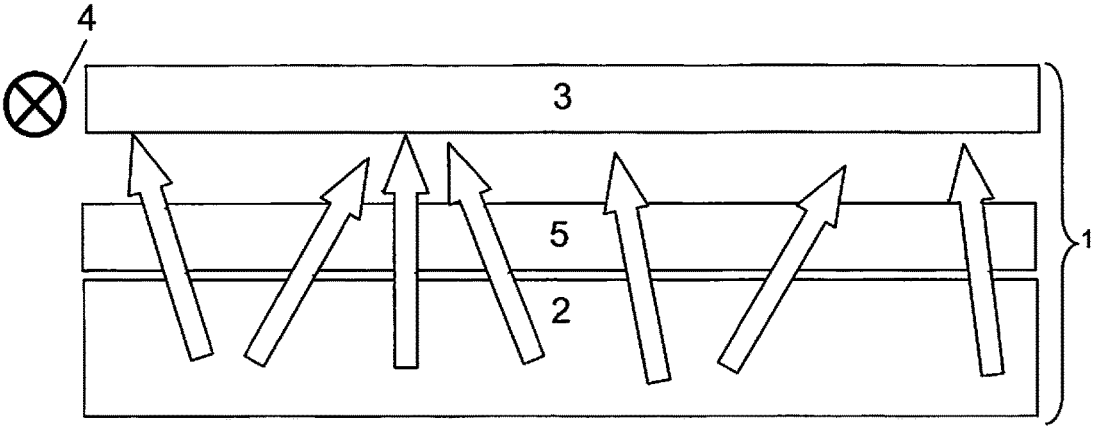
FIG. 6 is a sketch illustrating the principle of the second embodiment of the screen in the operating mode for a free viewing mode.

Compared with this, FIG. 6 is a sketch illustrating the principle of the second embodiment of the screen 1 in operating mode B1 for a free viewing mode, wherein the imager 5 is illuminated by light whose spatial angle is unrestricted (see the hollow arrows), and wherein the light modulated by the imager 5 is not superimposed upon by light coming out of a light guide 3, because the light sources 4 are switched off.

Figure 7:
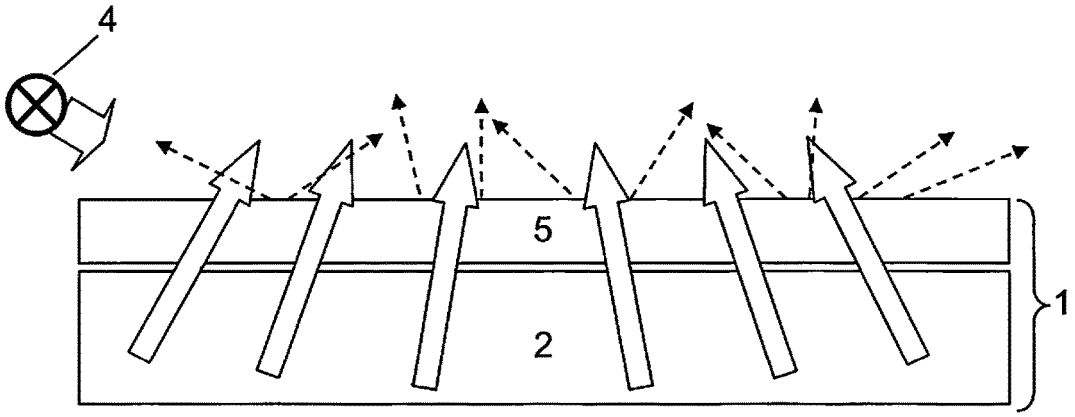
FIG. 7 is a sketch illustrating the principle of a third embodiment of a screen in the operating mode for a restricted viewing mode.

FIG. 7 is a sketch illustrating the principle of a third embodiment of a screen 1 according to the invention, shown in operating mode B2 for a restricted viewing mode, in which the imager 5 is illuminated by light whose spatial angle is restricted (see the hollow arrows), wherein the light modulated by the imager 5 is superimposed upon by light originating from a light source 4 arranged at a distance (see the broad arrow at the light source 4), and wherein the light is then reflected or scattered off the screen surface back into the viewing space (represented by the dashed arrows) in order to enhance the privacy protection effect. Here, unlike the embodiment shown in FIG. 5, the light sources 4 are not situated at the same height as the light guide 3 but still farther away from the imager 5, or possibly even separated in space from the screen 4.

In the following passage, a very useful application of the embodiment shown in FIG. 7 is described as an example: In an automobile, a screen 1 for displaying navigation, entertainment and other data is arranged on the front passenger side. To display data of importance to the driver, such as for navigation, the invented screen 1 would switch to operating mode B1 for a free viewing mode, so that the data could be seen by the driver and the front passenger. If, however, the screen was used as an entertainment medium for the passenger, the display might distract the driver. Therefore, the screen 1 would preferably be switched to operating mode B2 for a restricted viewing angle, so that the driver would discern nothing, or closest to nothing, on the screen 1 and, thus, his or her attention would not be taken off the driving procedure. In order to exclude, according to the invention, any residual visibility of image information on the imager 5, one or several light sources 4, preferably white LEDs, are provided. In the vehicle, these may be installed, e.g., in the front passenger door. For the operating mode B2, these light sources 4 are switched on to illuminate the imager 5 sideways from some distance. As a result, residual visibility of the display on imager 5 for the driver is eliminated completely, or at least almost completely, since, as described above, the light reflected or scattered back by the imager 5 is superimposed on, and thus outshines, any light emanating from the imager 5 towards the driver. Preferably in this embodiment, the light sources 4 are provided with means for focusing, e.g., simple lenses in front of the LEDs, and with a suitable glare stop shield, so that none of the persons in the automobile is annoyed by light directed at them. Optimally, the light originating from the light sources 4 is almost completely incident on the imager 5.

In all arrangements described so far, in operating mode B1 for a free viewing mode, the backlight 2 emits light in an unrestricted angular range. Unlike in operating mode B2, the light sources 4 are switched off, so that the light originating from the backlight 2 and then passing the transmissive imager 5 passes the light guide 3 essentially unaffected.

As a rule, the plate-shaped light guide has a haze value of less than 10%, preferably less than 4%, measured in accordance with ASTM D1003. Further, the scattering particles especially eligible are titanium dioxide particles. However, other embodiments are possible, using, e.g., particles of barium sulfate, silsesquioxane particles or cross-linked polystyrene particles, or particles of other kinds. As a rule, the scattering particles are homogeneously distributed, so that the light guide 3 does not have any inhomogeneous optical structure. Further, the plate-shaped light guide 3 has at least two faces facing each other and arranged in parallel or inclined relative to one another. A wedge-shaped structure is possible, although parallel faces are advantageous.

The backlight extended in a planar manner 2 may be configured, e.g., as proposed in WO 2015/121398.

Figure 8:
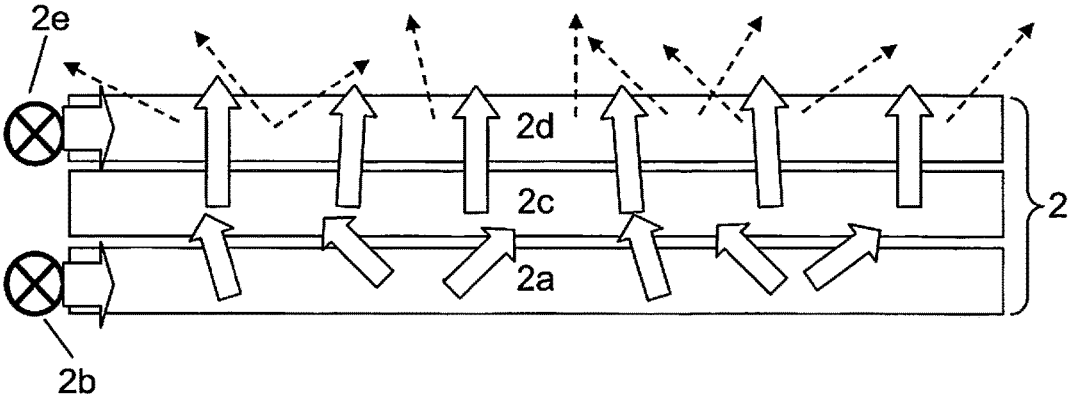
FIG. 8 is a sketch illustrating the principle of an advantageous embodiment of a backlight, shown here for an operating mode for a free viewing mode.
Figure 9:
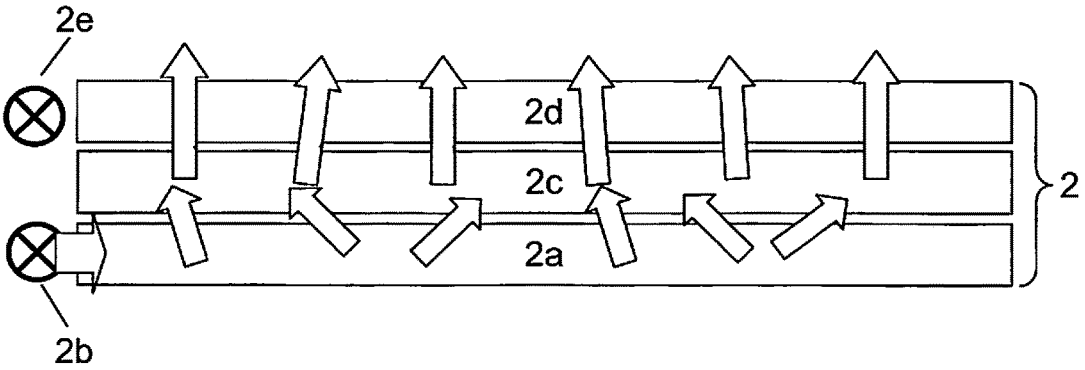
FIG. 9 is a sketch illustrating the principle of the backlight of FIG. 8, but in an operating mode for a restricted viewing mode.

In that connection, FIG. 8 illustrates the principle of an advantageous embodiment of a backlight 2, shown here for operating mode B1 for a free viewing mode. Accordingly, FIG. 9 is a sketch illustrating the principle of the backlight 2 of FIG. 7 for operating mode B2 for a restricted viewing mode.

Such a backlight 2 consists, for example, of:

- a surface emitter 2a preferably configured as a light guide with laterally arranged light sources 2b, at least one light collimator 2c integrated into the surface emitter 2a and/or arranged in front of the same, e.g., two crossed BEF sheets, two crossed model 2301 optical lighting films" (OLF) made by 3M™, and/or one or several privacy filters, e.g., Vikuiti made by 3M™,
- a plate-shaped, transparent light guide 2d that is arranged in front of the light collimator 2c as seen in the viewing direction and that consists of a transparent thermoplastic or thermoelastic material with scattering particles distributed therein, and
- light sources 2e arranged laterally at the edges of the light guide 2d.

In operating mode B1 for a free viewing range as shown in FIG. 8, at least the light sources 2e, and, in that example, also the surface emitter 2a are switched on; that is to say, if the surface emitter 2a is configured as a light guide, the light sources 2b of the surface emitter 2a will, of course, be switched on.

In the operating mode B2 for a restricted viewing range as shown in FIG. 9, the light sources 2e are off, and the surface emitter 2a is on; i.e., if the surface emitter 2a is configured as a light guide, the light sources 2b are likewise on.

For the light guide 2d, the configurations possible for light guide 3 as mentioned before apply analogously. The broad arrows at the light sources 2b, 2e and 4 in FIG. 3, FIG. 8 and FIG. 9 indicate that these light sources are on. The light sources 2b, 2e, 4 are preferably (cold-light) white LED rows.

The scattering particles used in the transparent light guides 2d, 3, and possibly also 2b, preferably are titanium dioxide particles of a mean particle size of 150 to 500 nm in a concentration of 0.01 to 300 wt.-ppm related to the weight of the respective light guide.

It is also possible that the transparent light guides 2d, 3, and possibly also 2b, consist of a matric plastic A and, distributed therein, scattering particles of a polymerizate B, with the share of the polymerizate B scattering particles being 0.01 to 3 wt.-% related to the matrix plastic A, and with the refractive index nD(B) of the polymerizate B being higher than the refractive index nD(A) of the matrix plastic A by at least 0.002 units.

In an advantageous embodiment, means for diminishing reflection, e.g., an antiglare and/or antireflection coating, are arranged on the top surface of the imager 5 and/or on at least one of the faces of the light guide 3. In connection with the invention, especially an antiglare coating will not only reduce direct reflections of external light spots, but also permit the light radiated by the light guide 3 towards the imager 5 to be diffusely reflected back.

Although in most of the known embodiments, a backlight 2 extended in a planar manner as described above will, in operating mode B2 for a restricted viewing mode, radiate light into a restricted angular range, this direction selection is far from perfect, the result of which is that on a transmissive imager 5 in front of such a backlight one can still discern the complete image content or large portions thereof even when looking at it obliquely, though with low brightness and/or low bright-to-dark contrast. The present invention will completely, or almost completely, eliminate this imperfection.

In case of the second embodiments according to FIG. 5 and FIG. 6, the light sources 4 are switched on in operating mode B2; therefore, the light radiated by backlight 2 into a restricted angular range and then passing the transmissive imager 5 is superimposed upon by light which the imager 5, due to being irradiated by light from the light sources 4, scatters and/or reflects back into the viewing space in a diffuse and/or direct manner, thus reducing the residual visibility, outside the said restricted angular range, of an image displayed on the transmissive imager 5; or, in other embodiments, the light radiated by the backlight 2 into a restricted angular range and then passing the transmissive imager 5 is superimposed upon by light which the imager 5, due to being irradiated by light from the light guide 3, scatters and/or reflects back into the viewing space in a diffuse and/or direct manner, and/or by light which is radiated by the light guide 3 into the viewing space, so that, outside the said restricted angular range the residual visibility of an image presented on the transmissive imager 5, is reduced.

In case of the first embodiments according to FIG. 3 and FIG. 4, the residual visibility, outside the said restricted angular range, of an image displayed on the transmissive image is substantially reduced by the fact that light radiated by the backlight 2 into a restricted angular range and then passing the transmissive imager 5 is superimposed upon by—possibly colored—light radiated by the light guide 3 in a planar manner over a wide angular range.

Figure 10:
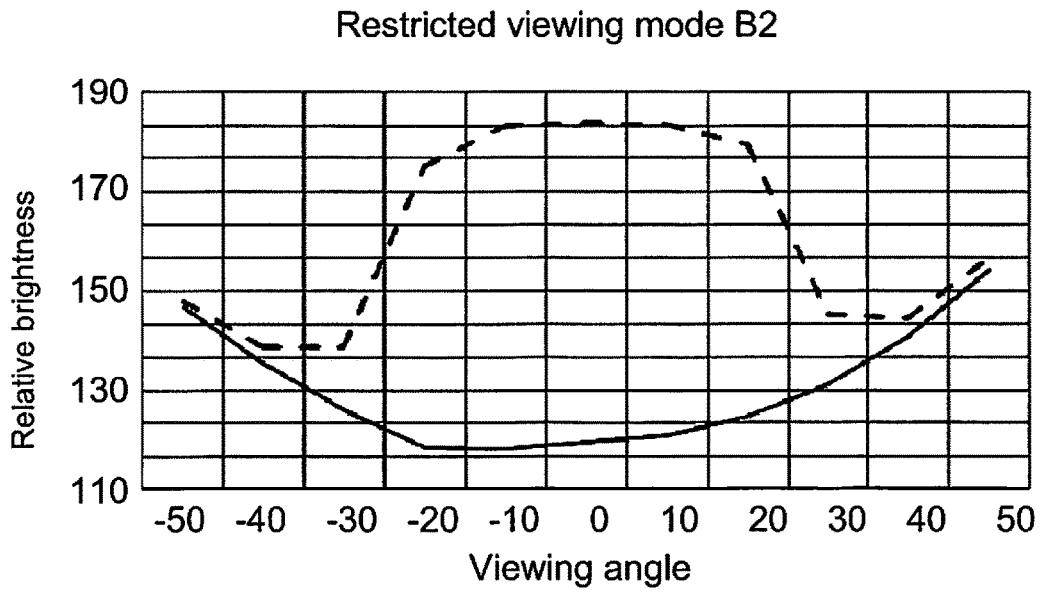
FIG. 10 is an exemplary measurement of the viewing conditions of looking at a screen in the operating mode for a restricted viewing mode.
Figure 11:
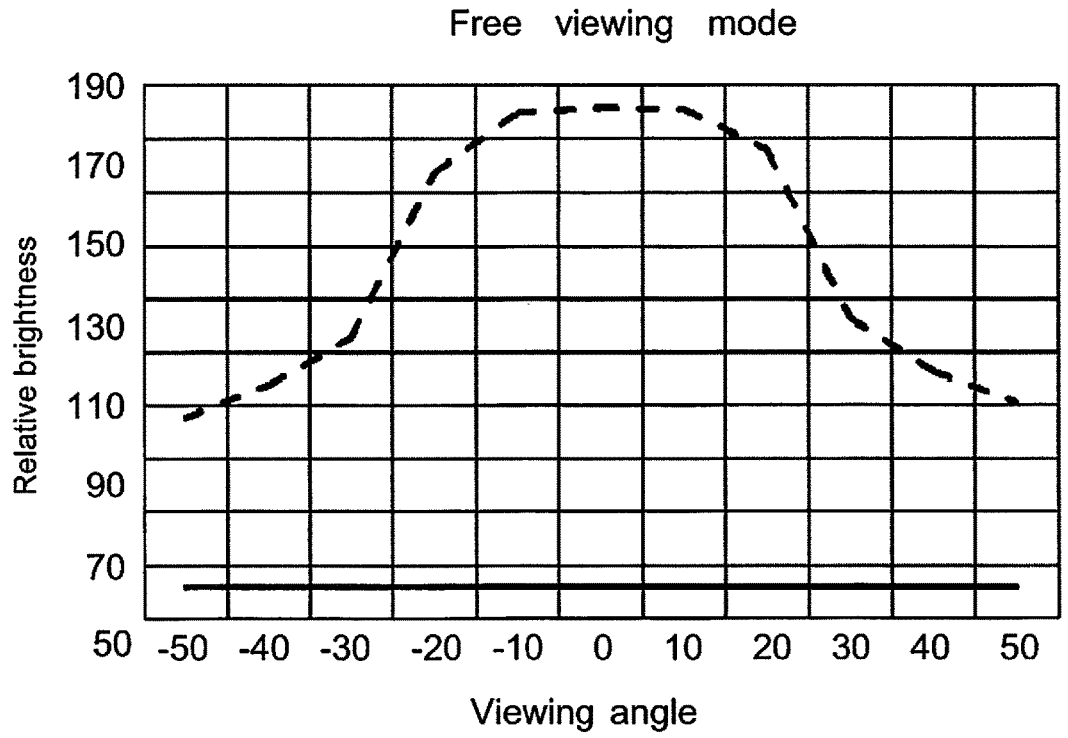
FIG. 11 is an exemplary measurement of the viewing conditions of looking at a screen in the operating mode for a free viewing mode.

For better understanding, this is visualized in FIG. 10 and FIG. 11 by measured data. FIG. 10 is a graph of the visibility conditions for looking at an exemplary screen in operating mode B2, and FIG. 11 is a graph of the visibility conditions for looking at an exemplary screen in operating mode B1.

In both graphs, the abscissa marks the viewing angle, measured from the screen center and relative to the vertical bisector, whereas the ordinate marks a relative—and therefore unitless—brightness value for the luminance. Also in both graphs, the broken signal curve represents the measurement for a white area in the middle of the screen, whereas the solid signal line represents the measurement for a black area in the middle of the screen.

In FIG. 10 it is evident that, if all light sources are configured as white LEDs (or LED rows), the image perceptible in operating mode B2 from oblique viewing directions blocked beyond +/−30 degrees to the left and right relative to the vertical bisector corresponds to a gray or white area: Here, the contrast between black and white is cancelled, because the light radiated by the light guide 3 itself visibly conceals any black image content by gray or white. With regard to interpreting the signal curve, this means the following: In the embodiment of this measurement example, the difference between looking at a black and a white area from viewing angles beyond +/−30 degrees to the left and right relative of the vertical bisector virtually no longer exists; thus, an image content is no longer perceptible: privacy protection against oblique viewing is active. As against conventional technologies, privacy protection in operating mode B2 is distinctly improved. Although, in this operating mode, contrast in black-white transitions of the image is also diminished, due to the light originating from the light guide 3, which is superimposed on the light of the imager 5 that the image information is modulated on. Still, the black-white contrast is clear enough for a user looking at the screen from directions corresponding to small angles, e.g., smaller than 20 degrees about the vertical bisector, to recognize a clear and bright image.

Compared with this, FIG. 11 shows that, in operating mode B1, a distinct visual contrast can also be achieved from oblique angles, especially because no superimposition of light from the light guide 3 exists, since this light guide does not emit any light in this operating mode and allows the light to pass the imager 5 virtually unaffected.

Figure 12:
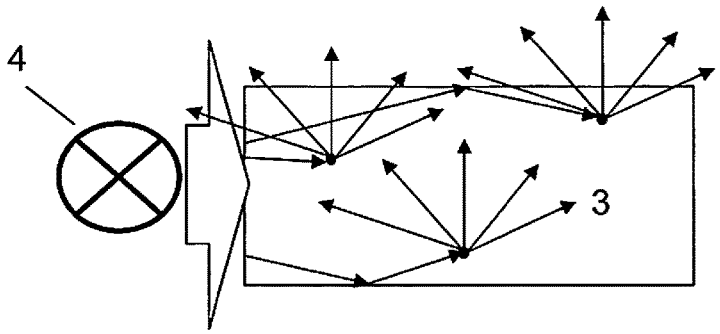
FIG. 12 shows the outcoupling of light for a fourth embodiment of the screen.

FIG. 12 is a sketch illustrating the principle of the outcoupling of light laterally coupled into an optical element 3 from light sources 4 (shown here as a small segment only in a sectional view), into a spatial angle of the largest possible extent for a fourth embodiment of a screen 1. The small dots represent scattering particles as scattering centers for the light laterally coupled in from the light sources 4. Here, the preferred scattering particles for the light guide 3 are titanium dioxide particles in a concentration of 0.1 to 50 wt.-ppm, or preferably 0.1 to 10 wt.-ppm., related to the weight of the light guide 3, and/or the titanium dioxide particles have a mean particle size of 160 to 450 nm or, with particular preference, 170 to 400 nm.

Due to total reflection, rays of the light coupled in are thrown off the outer wall back into the light guide 3 until they eventually hit a scattering particle that effects the desired outcoupling. For better understanding, the representation in FIG. 1 is highly schematic; in reality, the light guide 3 guides a vast number of ray paths. The passing of light from a backlight 2 through the light guide 3 is analogous to that shown in FIG. 2. The scattering particles play a negligible part here, as the light originates from the backlight 2 in a directed manner and is not, or scarcely, deflected back and forth in the light guide by total reflection.

Figure 13:
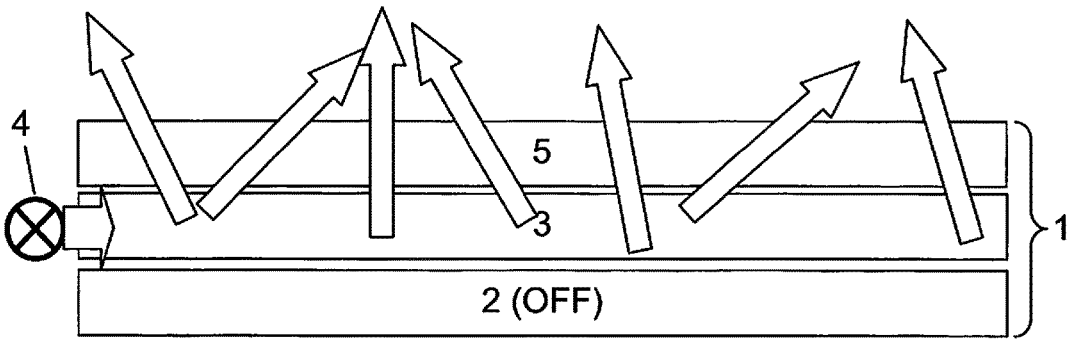
FIG. 13 is a sketch illustrating the principle of the fourth embodiment of the screen in the operating mode for a free viewing mode with the backlight switched off.
Figure 14:
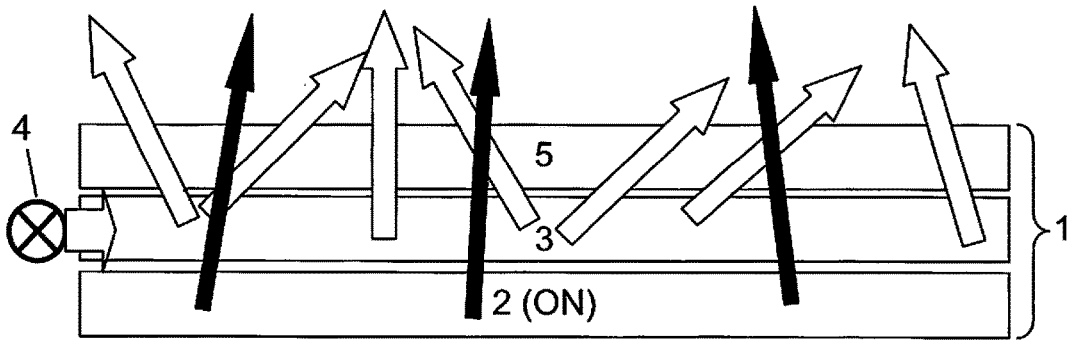
FIG. 14 is a sketch illustrating the principle of the fourth embodiment of the screen in the operating mode for the free viewing mode with the backlight switched on, FIG. 15 is a sketch illustrating the principle of the fourth embodiment of the screen in an operating mode for a restricted viewing mode.
Figure 15:
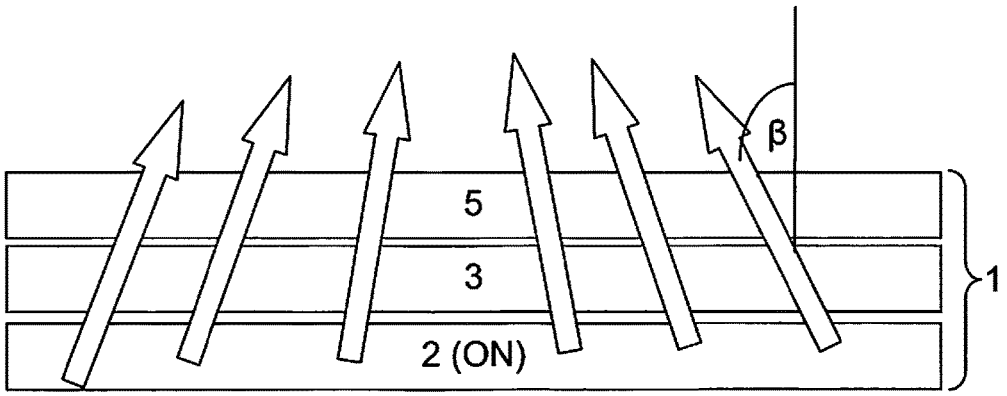
Figure 16:
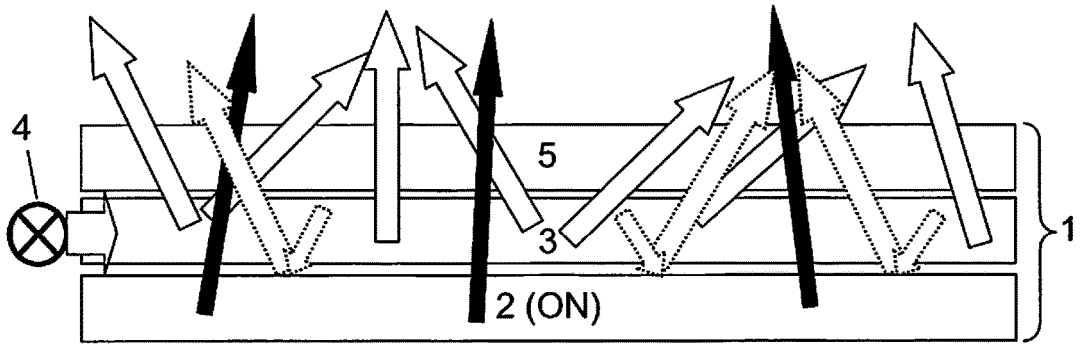
FIG. 16 is a sketch illustrating the principle of a fifth embodiment of the screen in an operating mode for a free viewing mode with the backlight switched on, and FIG. 17 is a graph of an exemplary brightness distribution in different spatial directions, regarding the light coupled out of an optical element.

FIG. 13 is a sketch illustrating the principle of a screen 1 according to the fourth embodiment in a first operating mode B1 for a free viewing mode, wherein a spatial angle of the greatest possible extent is illuminated, with the screen 1 being used together with an imager 5, and with the backlight 2 switched off. FIG. 14 shows a modification thereof, with the backlight 2 switched on; the black arrows represent the light originating from the backlight 2. As a modification of the version according to FIG. 14, FIG. 16 illustrates the principle of a fifth embodiment, wherein partial reflection off the surface of the backlight 2 leads to some kind of recycling of the light exiting downwards from the face of the light guide 3, represented by the dotted-line arrows. This arrangement improves the light yield. Finally, FIG. 15 is a sketch illustrating the principle of the fourth embodiment of the screen 1 in a second operating mode B2 for a restricted viewing mode, wherein a restricted spatial angle is illuminated; here again, the screen 1 is used together with an imager 5.

The invented screen 1 schematically illustrated in drawings FIG. 13 through FIG. 16, which is operated in at least two operating modes, viz B1 for a free viewing mode and B2 for a restricted viewing mode, primarily comprises a backlight 2 extended in a planar manner, which in operating mode B1 for a free viewing mode radiates light into an unrestricted angular range, and in operating mode B2 for a restricted viewing mode radiates light into a restricted angular range, wherein the light originating from the backlight 2, in at least one direction located within an angle greater than 45 degrees relative to the surface normal of the backlight 2, is radiated with at most 6% of the maximum light intensity. The screen 1 further comprises a transmissive imager 5 arranged in front of the backlight 2 (seen in the viewing direction), at least one plate-shaped light guide 3, which is also arranged in front of the backlight 2 (seen in the viewing direction) and consists of a thermoplastic or thermoelastic material with scattering particles being homogeneously distributed therein, or is provided with outcoupling elements on at least one of the faces, and light sources 4 arranged laterally at the edges of the light guide 3.

If the light guide 3 contains scattering particles, these consist of titanium dioxide, barium sulfate, silsesquioxane particles and/or cross-linked polystyrene particles of a mean particle size of 150 to 500 nm, which are employed in a concentration of 0.01 to 300 wt.-ppm related to the weight of the light guide 3. In this case, the light guide 3 has neither anything printed on it nor light-scattering imperfections. In case of the outcoupling elements, these may be produced on the surface though, e.g., by etching.

In either case—scattering particles and outcoupling elements—the light guide is transparent to at least 85% of the light originating from backlight 2. In operating mode B1, then, the light laterally entering the light guide 3 from the light sources 4, for a free viewing range in directions located within angles between 45 degrees and 75 degrees relative to the surface normal of the backlight 2, is radiated with at least 12% of the maximum light intensity of the light exiting the light guide 3 normal to the surface. The light originating from the light sources 4 (if they are switched on) and exiting the light guide 3 from at least one point of its surface, has, in at least one angle $\alpha$ relative to the surface of the light guide, with $\alpha<80$ degrees, a higher light intensity than the light exiting normal to the surface of the light guide at the said point of that surface. Here, in operating mode B2, the backlight 2 is on and the light sources 4 are off; in operating mode B1, at least the light sources 4 are on.

In case scattering particles are used, the light guide 3 has neither anything printed on it nor any light-scattering imperfections and is transparent to at least 85% of the light originating from the backlight 2. If there were anything printed on it and/or any light-scattering imperfections on at least one of the two faces of the light guide 3, this would, in operating mode B2, scatter the light originating from the backlight 2 and passing the light guide 3, that light thus being radiated into more than a restricted angular range.

Figure 17:
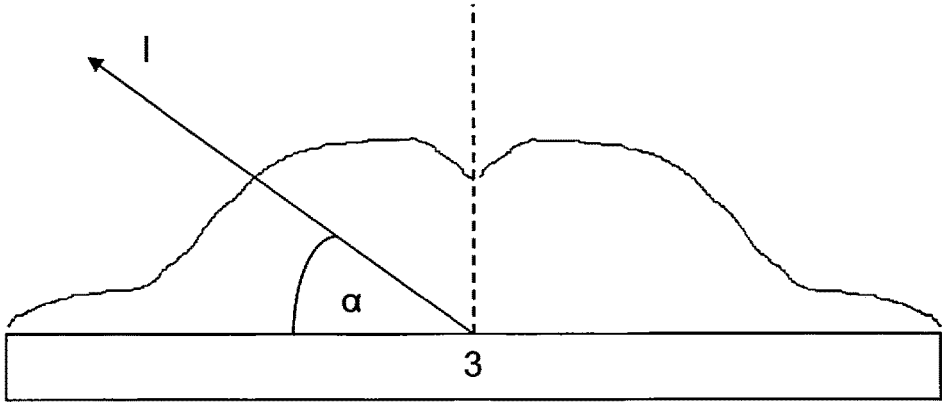

For operating mode B1 it is imperative that the light sources 4 are switched on, whereas the backlight 2 may be on or off. If the backlight 2 is off, only the light from the light sources 4 provides for the illumination of an unrestricted angle. If, however, both the light sources 4 and the backlight 2 are on in operating mode B1, greater brightness can be achieved. Then it is of particular advantage that the light originating from the light sources 4 (if they are on) and exiting from at least one point of the surface of the light guide 3 has, in at least an angle $\alpha$ relative to the surface of the light guide 3, with $\alpha<80$ degrees, a higher light intensity than the light exiting from the said point of the surface of the light guide 3 normal to that surface, as sketched in FIG. 17. The arrow labelled "I" indicates the light intensity radiated in the respective angle $\alpha$ horizontally to the light guide 3. This technical implementation, namely, means that the light which originates from the light sources 4 and which has its highest brightness not along the vertical bisector of the screen 1 is an excellent complement to the light which originates from the backlight 2 and has its highest brightness approximately along the vertical bisector of the screen 1, resulting, across at least one half angle—e.g., the angular spectrum of the horizontal in front of the screen 1—in a more homogeneous and, in all, brighter illumination than that achieved if only the light sources 4 were switched on for operating mode B1.

The preferred scattering particles for the light guide 3 are titanium dioxide particles in a concentration of 0.1 to 50 wt.-ppm, or preferably 0.1 to 10 wt.-ppm, related to the weight of the light guide 3, and/or the titanium dioxide particles have a mean particle size of 160 to 450 nm or, with particular preference, of 170 to 400 nm.

Further, the light guide 3 has a haze value lower than 7% or preferably lower than 2%, measured according to ASTM D1003.

Furthermore, it is of advantage for the light guide 3 to contain at least 40 wt.-% polymethyl methacrylate or preferably at least 60 wt.-% polymethyl methacrylate, related to its weight.

Another embodiment of the screen 1 provides that, for operating mode B2, the light originating exclusively from the backlight 2 and exiting the light guide 3 in the viewing direction at every point of its surface has, in angles $\beta>30$ degrees (see also FIG. 15 for the definition of the angle $\beta$) measured normal to the surface of the light guide 3 and in horizontal orientation relative to the surface of the light guide 3, maximally 5% of the light intensity than the light intensity of the light exiting from such a point of the surface of the light guide 3 normal to that surface. With particular preference, the backlight 2 is additionally provided with an optical layer that collimates the light to achieve a restricted-angle radiation characteristic of the light emitted by the backlight 2.

The backlight 2 is preferably, e.g., a sidelight, edgelight, direct LED backlight, edge LED backlight, OLED or some other surface emitter, on which a permanent privacy filter (e.g., Vikuiti™ made by 3M™ or LCF made by Shin Etsu™) acting as a light collimator or as a spatial light filter is applied, which causes the light that has passed it to be radiated by the backlight 2 essentially in a restricted angular range only. In addition to the at least one collimating layer, components of the type of "Optical Lighting Film" (OLF) model 2301 made by 3M™, crossed at an angle of 90 degrees, may be provided to achieve pre-collimation and to bundle the light.

It is further possible that the nearest optical component below the light guide 3 has a surface that at least partially reflects the light exiting downward from the light guide 3 in operating mode B1, and that light radiated downward in this way is at least partially reflected back into the light guide 3 and at least partially passed through it, as suggested by the dashed-line arrows in FIG. 5. As the light guide 3 radiates light from both its faces, i.e., upwards and downwards (the downward direction being that facing the backlight 2), this provides a kind of light recycling. Here, it may suffice that the said nearest optical component, i.e., frequently the optical collimation layer (e.g., the privacy filter) of the backlight 2, is not antiglared or is provided with a partial mirroring layer that is as transparent as possible to light coming from below, i.e., from the backlight 2.

The light sources 4 are LEDs, for example. Moreover, it is useful if the coupling of light from the laterally arranged light sources 4 into the light guide 3 is effected from at least two, preferably opposite, edges.

Arranged in front of the light guide 3 is a transmissive imager 5, e.g., an LCD panel, as shown in the drawings FIG. 13 through FIG. 16. In this way, the two operating modes B1 and B2 can be analogously implemented for the imager 5. In the first operating mode B1 for a free viewing range, then, a viewer can see an image on the imager 5 from a spatial angle of the widest possible extent at full resolution. Conversely, in the second operating mode B2 for a restricted viewing range, the image displayed on imager 5 can also be perceived at full resolution, but only from a restricted spatial angle, which corresponds to a privacy viewing mode. Depending on the configuration of the parameters for the illuminating angle, then, also the visible area of the image displayed on the imager 5 can be seen from a correspondingly restricted spatial angle only.

It is further of advantage if the rear surface of the transmissive imager 5 is provided with a partial mirror coating so as to further homogenize the light yield from the light guide 3. This partial mirror coating can also feature variations or be applied in certain areas only in order to compensate brightness differences, analogously to the partial mirror coating on the light guide 3.

It is advantageous also if backlight 2 is already designed as a collimated backlight, also known as "directional backlight"; here, the light source is conceived for its light to be radiated only into a restricted angular range as described before. Furthermore, it may be favorable always to use the same light sources, e.g., the laterally arranged light sources 4, for both operating modes. For switching between the two operating modes B1 and B2 then, the light is alternatingly coupled into the light guide 3 and into the backlight 2, respectively, by means of an optoelectronic and/or optomechanical switch. Eligible switches may be, e.g., a shutter or some mechanical switching device such as a tiltable mirror. Also, the light sources 4 may be configured to form two rows, with only the row being switched on that is desired or appropriate.

Further, the radiation directions desired or allowed for mode B2 (for restricted viewing) may be defined and implemented separately for the horizontal and the vertical direction. For example, it may be useful if the angle in the vertical direction is greater than that in the horizontal direction, e.g., if persons of differing body heights are intended to see information on an ATM, whereas the view sideways has to be greatly restricted. This is achieved especially by selection of the light-collimating layers, e.g., privacy filters.

The embodiments of screens 1 enable well practicable solutions to implement the secure presentation of information by way of an optionally restricted viewing angle, while offering another operating mode that permits a free view with as little restriction of the viewing angle as possible. This screen 1 can be implemented by simple means and at low cost. The native resolution of the imager 5 employed can be utilized in both operating modes B1 and B2. In addition, light loss is kept low or even avoided, depending on the embodiment.

The above-described screen 1 with transmissive imager 5 can be used to advantage wherever confidential data are displayed and/or entered, such as entry of PINs or display of information at ATMs, payment terminals or mobile devices, or entry of passwords or reading E-mails and SMS texts on mobile devices.

In contrast to embodiments in prior art, which, as a rule, exhibit a residual visibility also from oblique angles, the invention can achieve the complete elimination of residual visibility from blocked viewing angles, subject to the embodiment. Furthermore, in contrast to prior art, the invention neither requires a high-power UV light source, nor the complex conversion of restricted-angle light distributions into unrestricted ones (which substantially diminishes brightness), nor complex prism or microlens structures.

LIST OF REFERENCE NUMERALS

1 screen
2 backlight
2a surface emitter
2b light sources
2c light collimator
2d plate-shaped light guide
2e light sources
3 plate-shaped light guide
4 light sources
5 imager
B1 operating mode for a free viewing mode
B2 operating mode for a restricted viewing mode

What is claimed is:

1. A screen that can be operated in at least two operating modes, a free-viewing mode and a restricted viewing mode, comprising:

a backlight extended in a planar manner that, in the free-viewing mode, emits light into an unrestricted angular range, and, in the restricted-viewing mode, emits light in a restricted angular range;

a transmissive imager arranged in front of the backlight as seen in a viewing direction;

light sources arranged outside an active image display area of the imager, and at the same time at a distance of at least 1 millimeter above the imager, as seen in the viewing direction; and/or a plate-shaped light guide located in front of the imager as seen in the viewing direction, comprising a transparent thermoplastic or thermoelastic material and scattering particles distributed therein, and/or having outcoupling elements on at least one of its faces, with the light sources being arranged laterally at edges of the light guide;

wherein, in the free-viewing mode, the light sources are switched off, so that the light originating from the backlight and then passing the transmissive imager remains uninfluenced by the light sources or, if a light guide is provided, passes the light guide essentially uninfluenced; and wherein, in the restricted-viewing mode, the light sources are switched on, so that the light radiated by the backlight into the restricted angular range and then passing the transmissive imager is superimposed on by light that the imager scatters or reflects back into the viewing space in a diffuse and/or specular manner due to the irradiation of light from the light sources, or that, if a light guide is provided, is scattered or reflected back into the viewing space in a diffuse and/or specular manner due to the irradiation of light from the light guide and/or is radiated into the viewing space by the light guide in a planar manner over a wide angular range;

whereby, outside the restricted angular range, a residual visibility of an image displayed on the transmissive imager is diminished.

2. The screen as claimed in claim 1, wherein the backlight comprises:

a surface emitter, including a light guide with laterally arranged light sources;

at least one light collimator integrated in the surface emitter and/or arranged in front of it;

a plate-shaped, transparent light guide arranged in front of the light collimator as seen in the viewing direction, comprising a transparent thermoplastic or thermoelastic material and scattering particles distributed therein, and/or having outcoupling elements on at least one of its faces; and light sources arranged laterally on edges of the light guide;

wherein, in the free-viewing mode, at least the light sources, and, optionally, also the surface emitter are switched on; and wherein, in restricted-viewing range, the light sources are switched off and the surface emitter is switched on.

3. The screen as claimed in claim 1, wherein the scattering particles employed in the transparent light guides are titanium dioxide particles of a mean particle size of 150 to 500 nm in a concentration of 0.01 to 300 wt.-ppm related to the weight of the respective light guide.

4. The screen as claimed in claim 1, wherein the transparent light guides each comprise a matrix plastic and, distributed therein, scattering particles of a polymerizate, wherein a share of the scattering particles comprising the polymerizate is 0.01 to 3 wt.-% related to the matrix plastic, and wherein a refractive index of the polymerizate is higher than a refractive index of the matrix plastic by at least 0.01 units.

5. The screen as claimed in claim 1, wherein a reflection reducing coating is arranged on a top surface of the imager and/or on at least one of the faces of the light guide.

6. The screen as claimed in claim 1, wherein the light sources are LEDs or Laser diodes.

7. The screen as claimed in claim 1, wherein the light sources are adapted to emit colored light.

8. The screen as claimed in claim 1, wherein the light sources emit light of a color that is not present in the image displayed by the transmissive imager.

9. The screen as claimed in claim 1, wherein the light sources emit light of a color that is present in the image displayed by the transmissive imager or is located close to such a color in the color spectrum.

10. The screen as claimed in claim 1, wherein the light sources emit light of a color that approximately corresponds to a color that is complementary to a color present in the image displayed by the transmissive imager.

11. The screen as claimed in claim 1, wherein a nearest optical component below the light guide has at least one partially reflecting surface for light exiting downwards from the light guide in the free-viewing mode, and that, thereby, light radiated downward in that manner is at least partially reflected back onto the light guide and at least partially passes it.

12. The screen as claimed in claim 1, wherein the backlight includes at least one optical layer for collimating light.

13. The screen as claimed in claim 1, wherein the backlight is a sidelight, edgelight, direct LED backlight, edge LED backlight, OLED or some other surface emitter, on which at least one permanent privacy filter is applied.

[14. Use of the screen as claimed claim 1 for the entry or display of confidential data, the confidential data selected from the group consisting of: PIN numbers, E-mails, SMS texts, and passwords at ATMs, payment terminals or mobile devices.]

15. A screen that can be operated in at least two operating modes, a free-viewing mode and a restricted-viewing mode, comprising:

a backlight extended in a planar manner that, in the free-viewing mode, emits light into an unrestricted angular range, and, in the restricted-viewing mode, emits light in a restricted angular range, wherein light originating from the backlight, in at least one direction lying within an angle greater than 45 degrees relative to a surface normal of the backlight, is radiated at no more than 6% of a maximum light intensity;

a transmissive imager arranged in front of the backlight as seen in a viewing direction;

at least one plate-shaped light guide located in front of the backlight as seen in the viewing direction, comprising a thermoplastic or thermoelastic material and scattering particles distributed therein, or having outcoupling elements on at least one of its faces; and light sources being arranged laterally at edges of the light guide;

wherein, when scattering particles are provided in the light guide, the scattering particles comprise titanium dioxide, barium sulfate, silsesquioxane particles and/or cross-linked polystyrene particles of a mean particle size of 150 to 500 nm, which are used in a concentration of 0.01 to 300 wt.-ppm related to the weight of the light guide, and wherein the light guide has nothing printed on it and no light-scattering imperfections;

and wherein the light guide is transparent to at least 85% of the light originating from the backlight;

so that, in the free-viewing mode, light laterally incident from the light sources into the light guide in directions located within angles between 45 degrees and 75 degrees relative to the surface normal of the backlight are radiated at no less than 12% of the maximum light intensity of light radiated from the light guide normal to the surface;

and so that the light originating from the light sources, if they are switched on, and exiting the light guide from at least one point of its surface, has, in at least one angle $\alpha$ relative to the surface of the light guide, with $\alpha<80$ degrees, a higher light intensity than the light exiting from the said point of the surface of the light guide normal to that surface;

wherein, in the restricted-viewing mode, the backlight is switched on, and the light sources are switched off, and wherein, in the free-viewing mode, at least the light sources are switched on.

16. The screen as claimed in claim 15, wherein the angle of the direction in which the light originating from the backlight is radiated, is greater than $45+\gamma$ degrees relative to the surface normal of the backlight, wherein the backlight includes at least one layer for collimating the light it emits, this layer having its highest light transparency at an angle of $\gamma$ with $0<\gamma<45$ degrees relative to the surface normal of the backlight.

17. The screen as claimed in claim 15, wherein the light guide has a haze value lower than 7%, measured according to ASTM D1003.

18. The screen as claimed in claim 15, wherein the scattering particles used are titanium dioxide particles in a concentration of 0.1 to 50 wt.-ppm, or preferably 0.1 to 10 wt.-ppm, related to the weight of the light guide, and/or that the titanium dioxide particles have a mean particle size of 160 to 450 nm.

19. The screen as claimed in claim 15, wherein the light guide contains at least 40 wt. %, of polymethyl methacrylate, related to its weight.

20. The screen as claimed in claim 15, wherein for the restricted-viewing mode, the light originating exclusively from backlight and exiting from the light guide at every point of its surface in angles $\beta>30$ degrees, measured normal to the surface of the light guide and in horizontal orientation relative to that surface, has maximally 5% of the light intensity of the light exiting from such a point of the surface of the light guide normal to its surface.

*21. A screen that can be operated in at least two operating modes, viz B1 for a free viewing mode and B2 for a restricted viewing mode, comprising:*

*a backlight extended in a planar manner that emits light in a restricted angular range, wherein the light originating from the backlight, in at least one direction lying within an angle greater than 45 degrees relative to the surface normal of the backlight, is radiated at no more than 6% of the maximum light intensity, the backlight either being provided with an optical layer that collimates light, or being designed as a collimated backlight, each to achieve a restricted-angle radiation characteristic,*

*a transmissive imager arranged in front of the backlight as seen in the viewing direction,*

*at least one plate-shaped light guide located in front of the backlight between the backlight and the transmissive imager as seen in the viewing direction, comprising a thermoplastic or thermoelastic material, and either with scattering particles distributed therein or having outcoupling elements on at least one of its faces, and*

*light sources being arranged laterally at the edges of the light guide,*

*wherein, when scattering particles are provided in the light guide, the particles include at least one of titanium dioxide particles, barium sulfate particles, silsesquioxane particles and cross-linked polystyrene particles, of a mean particle size of 150 to 500 nm, which are used in a concentration of 0.01 to 300 wt.-ppm related to the weight of the light guide, and wherein the light guide has nothing printed on it and no light-scattering imperfections,*

*and wherein:*

*the light guide is transparent to at least 85% of the light originating from the backlight,*

*so that, in operating mode B1 for a free viewing range, the light laterally incident from the light sources into the light guide in directions located within angles between 45 degrees and 75 degrees relative to the surface normal of the backlight are radiated at no less than 12% of the maximum light intensity of the light radiated from the light guide normal to the surface,*

*and so that the light originating from the light sources, when they are switched on, and exiting the light guide from at least one point of its surface, has, in at least one angle $\alpha$ relative to the surface of the light guide, with $\alpha<80$ degrees, a higher light intensity than the light exiting from the said point of the surface of the light guide normal to that surface,*

*wherein, in operating mode B2, the backlight is switched on, and the light sources are switched off, and wherein, in operating mode B1, at least the light sources are switched on.*

*22. The screen as claimed in claim 21, wherein the angle of the direction in which the light originating from the backlight is radiated, is greater than $45+\gamma$ degrees relative to the surface normal of the backlight, wherein the backlight includes at least one layer for collimating the light it emits, this layer having its highest light transparency at an angle of $\gamma$ with $0<\gamma<45$ degrees relative to the surface normal of the backlight.*

*23. The screen as claimed in claim 21, wherein the light guide has a haze value lower than 7% measured according to ASTM D1003.*

*24. The screen as claimed in claim 21, wherein the scattering particles used are titanium dioxide particles in a concentration of 0.1 to 50 wt.-ppm, related to the weight of the light guide, and/or that the titanium dioxide particles have a mean particle size of 160 to 450 nm.*

*25. The screen as claimed in claim 24, wherein the titanium dioxide particles in are in a concentration of 0.1 to 10 wt.-ppm.*

*26. The screen as claimed in claim 21, wherein the light guide contains at least 40 wt.-% of polymethyl methacrylate, related to its weight.*

*27. The screen as claimed in claim 21, wherein, for operating mode B2, the light originating exclusively from backlight and exiting from the light guide at every point of its surface in angles $\beta>30$ degrees, measured normal to the surface of the light guide and in horizontal orientation relative to that surface, has maximally 5% of the light intensity of the light exiting from such a point of the surface of the light guide normal to its surface.*

* * * * *